(No Model.)
F. W. GRUELLICH.
STUMP EXTRACTOR.
No. 449,041.  Patented Mar. 24, 1891.
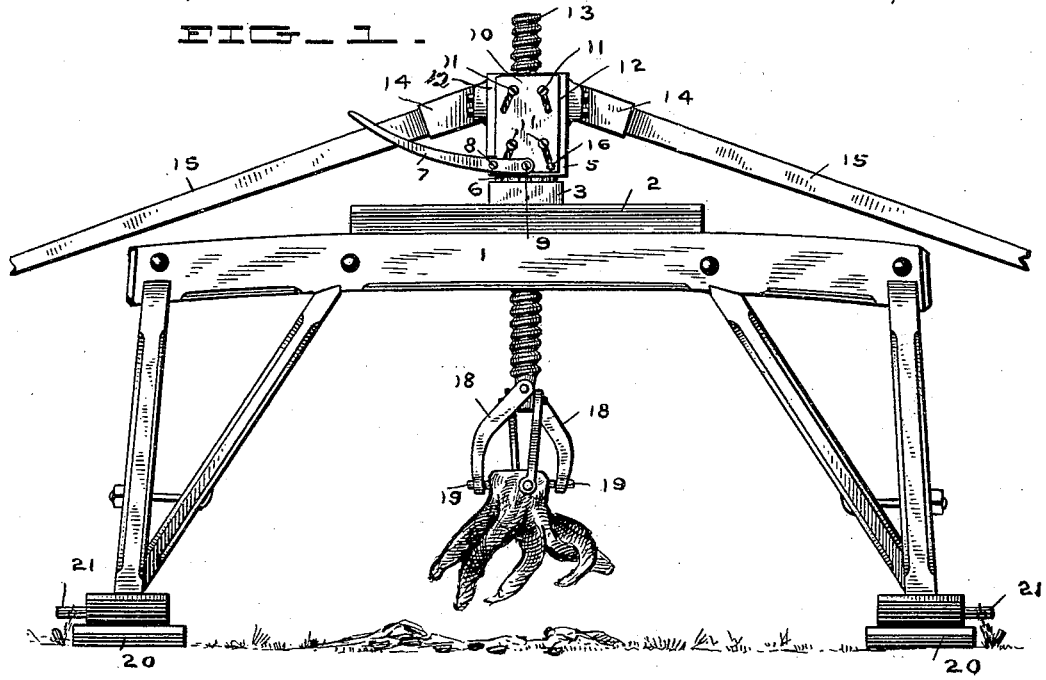
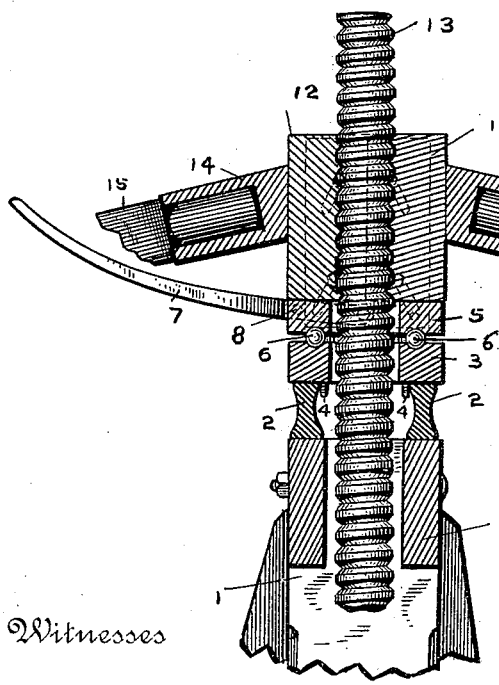
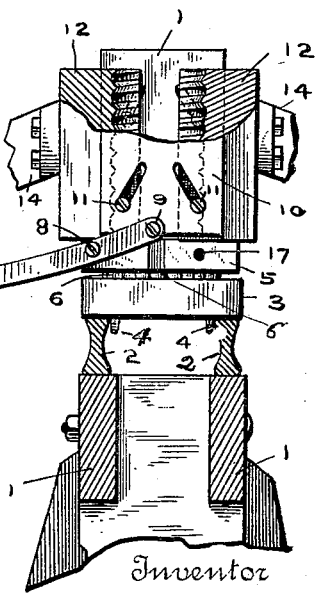
Witnesses
H. D. Healy.
E. P. Griffith.
Inventor
Friedrich W. Gruellich.
By his Attorney
C. P. Jacobs.

UNITED STATES PATENT OFFICE.

FRIEDRICH W. GRUELLICH, OF INDIANAPOLIS, INDIANA, ASSIGNOR OF ONE-HALF TO JOHANN G. RIES, OF SAME PLACE.

STUMP-EXTRACTOR.

SPECIFICATION forming part of Letters Patent No. 449,041, dated March 24, 1891.

Application filed February 5, 1891. Serial No. 380,354. (No model.)

*To all whom it may concern:*

Be it known that I, FRIEDRICH W. GRUELLICH, a subject of the King of Saxony, now domiciled and residing at Indianapolis, county of Marion, State of Indiana, have invented certain new and useful Improvements in Stump-Extractors; and I do hereby declare that the following is a full, clear, and exact description thereof, reference being had to the accompanying drawings, in which like figures refer to like parts.

My invention relates to the construction of machines for pulling stumps out of the ground; and it consists in the mechanism hereinafter described and claimed, and will be understood from the following description.

In the drawings, Figure 1 is a side elevation of my device. Fig. 2 is an enlarged vertical section through the divided nut and the supporting-frame, the lower part broken off. Fig. 3 is a view, partly in section, of the divided nut, showing it when separated by the action of the lever.

In detail, 1 is a frame-work suitably supported and braced at each end.

2 are track-irons set upon the top of the frame.

3 is a bearing-plate resting upon the track-irons, having lugs 4 for keeping it in position.

5 is a similar plate, and 6 are friction-balls which move in a groove between the bearing-plates 3 and 5. The bearing-plate 5 has a central opening and freely rotates about the screw, as hereinafter described.

7 are levers which are hinged by fulcrum-pins 8 to the revolving bearing-plate 5, these levers being pivoted at 9 to the movable plates 10, which are made of metal and are provided with radial slots.

11 are headed pins or screws passing loosely through these slots into the halves of the divided nut below, so that the plates 10 can be raised beneath the heads of the pins or screws 11 the length of their slots by the action of the levers 7.

12 is a nut, in which works the screw 13, the nut being formed in two halves to permit their separation and allow the screw to drop down, as shown in Fig. 3.

14 are sockets formed on each side of the halves of the nut for receiving the main operating-levers 15.

16 are pins which enter openings 17 on each side of the nut for locking the movable plates 10 to the rotating plate 5, thus preventing the separation of the halves of the divided nut 12. At the bottom of the screw 13 are pivoted grapple-arms 18, which are preferably curved in the manner indicated, having at their lower ends eyes to slip over pins 19, which are driven into holes bored in the stump to be extracted.

My machine operates as follows: The frame is set astride of the stump to be operated upon. Holes are bored in the stump and pins 19 are driven in, and the eyes of the grapple-arms 18 are slipped over these pins in the manner shown in Fig. 1. The operator then turns the levers 15, and the screw 13 works upward, engaging with the threads of the nut 12, and the machine exerts a twisting and pulling action upon the roots of the stump, which are thereby gradually but surely drawn from the soil, and the stump is lifted out and suspended in the manner shown in Fig. 1. The operator now draws out the locking-pins 16 from the holes 17, by which means the movable plates 10 are free to move up and down the sides of the divided nut. He then pulls down upon the levers 7, (of which there is one on each side,) raising the movable plates 10, and, these plates moving beneath the heads of the pins 11 along the line of the radial slots, the two halves of the nut 10 are thereby separated, and the screw 13 drops by gravity, being free from engagement with the threads of the nut, and the stump falls upon the ground. The operator then slips the grapple-arms off the ends of the pins in the stump, the pins are pulled out, and the operation is complete. This mechanism avoids the necessity of turning the screw backward for lowering the stump to the ground, saving a great deal of time, as well as wear upon the operative parts. The machine is provided with sledge-shaped runners or feet 20, to allow it to be drawn from place to place, and on the sides are pins 21 for hitching the traces of the team.

When it is desired to operate upon a new stump, the operator takes hold of the screw and lifts it up by hand far enough for its threads to engage with the halves of the divided nut. The locking-pins 16 are then inserted in their holes, locking the parts together, and the mechanism is ready for another operation.

What I claim as my invention, and desire to secure by Letters Patent, is the following:

1. In a stump-extractor, a lifting-screw, grapples connected at the lower end thereof, a divided nut in which the screw moves, slotted plates moving upon the opposite sides of the nut, locking-pins passing through such plates into the halves of the nut for locking the parts in operative position, main levers for revolving the nut and raising the screw, and auxiliary levers pivoted to the slotted plates for raising the same and effecting the division of the nut, so as to release the parts thereof from engagement with the screw, allowing the latter to drop, in combination with a supporting frame-work, substantially as shown and described.

2. In a stump-extractor, a nut formed in two halves, a lifting-screw adapted to engage with the same when united, a supporting frame-work, a collar loosely mounted on the screw below the nut bearing upon friction-balls resting in a grooved collar sliding upon tracks above the frame-work, slotted metal plates moving loosely on opposite sides of the divided nut, guide-pins passing through such slots into the halves of the nut, and means, such as auxiliary levers, pivoted to the slotted plates for raising the same, thereby separating the halves of the nut and freeing them from engagement with the lifting-screw, in combination with a supporting-frame and grapples connected to the lower end of the screw for carrying the load, substantially as shown and described.

3. In a stump-extractor, a divided nut 12, composed of two parts, the screw 13, having grapples 18, connected at its lower end, such screw working in the nut when the halves are locked together, the collar 5, loosely mounted upon the screw below such nut bearing on friction-balls 6, supported on a sliding collar 3, the latter supported upon tracks 2, resting upon a frame-work 1, in combination with operating-levers 15, entering sockets 14, connected with the sides of the nut, substantially as shown and described.

In witness whereof I have hereunto set my hand this 2d day of February, 1891.

FRIEDRICH W. GRUELLICH.

Witnesses:
H. D. NEALY,
J. G. RIES